March 27, 1951  D. F. PITCHER ET AL  2,546,199
LOADING ATTACHMENT FOR TRACTORS AND THE LIKE
Filed Jan. 9, 1947  2 Sheets-Sheet 1

INVENTORS.
Denzil F. Pitcher
Russell A. Dewey
BY
Attorney.

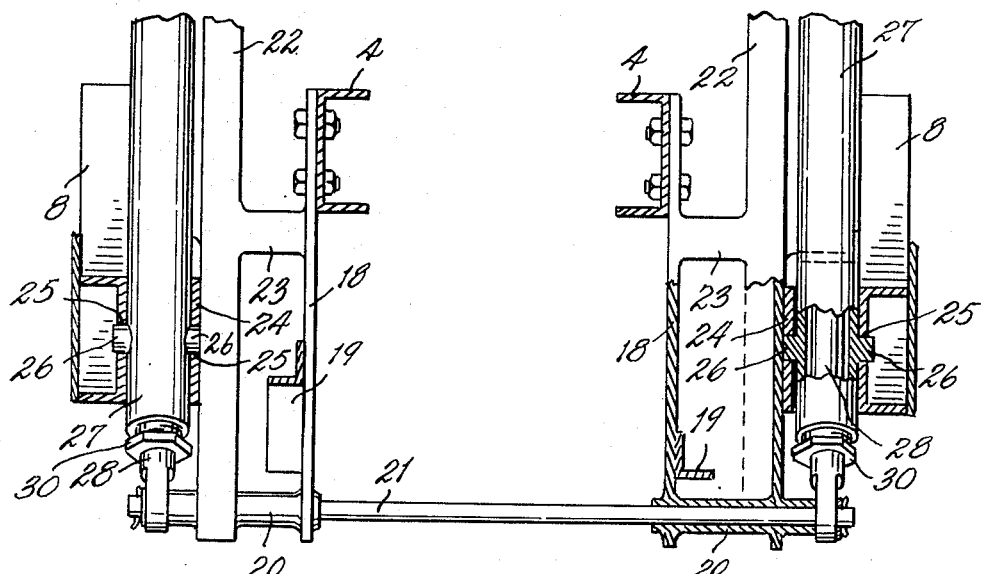
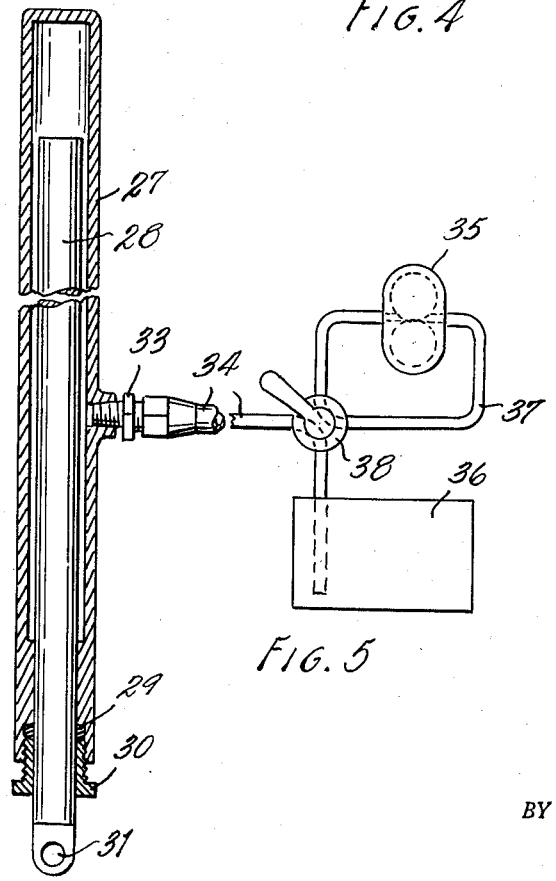

Patented Mar. 27, 1951

2,546,199

UNITED STATES PATENT OFFICE 2,546,199

LOADING ATTACHMENT FOR TRACTORS AND THE LIKE

Denzil F. Pitcher and Russell A. Dewey, Alto, Mich.

Application January 9, 1947, Serial No. 721,104

6 Claims. (Cl. 214—140)

This invention relates to improvements in a loading attachment for tractor.

The principal objects of this invention are:

First, to provide a loading attachment for farm tractors and the like which is simple and easy to attach and operate.

Second, to provide a loading attachment for a tractor or the like which does not obstruct the field of vision of the operator.

Third, to provide a loading attachment having a minimum of parts and which can be manufactured at low cost.

Fourth, to provide a loading attachment for tractors with a simplified elevating mechanism having only two moving parts.

Fifth, to provide hydraulic lifting mechanism for a loading attachment that will operate at relatively low pressures.

Other objects and advantages pertaining to the details and economies of the invention will appear from the description to follow and the claims.

The drawings, of which there are two sheets, illustrate a preferred form of the loading attachment.

Fig. 4 is a fragmentary cross sectional view along the broken vertical line 4—4 in Fig. 2.

Fig. 5 is a cross sectional view longitudinally through one of the hydraulic elevating cylinders with mechanism for supplying and controlling hydraulic fluid under pressure, conventionally shown, associated therewith.

Figure 1:
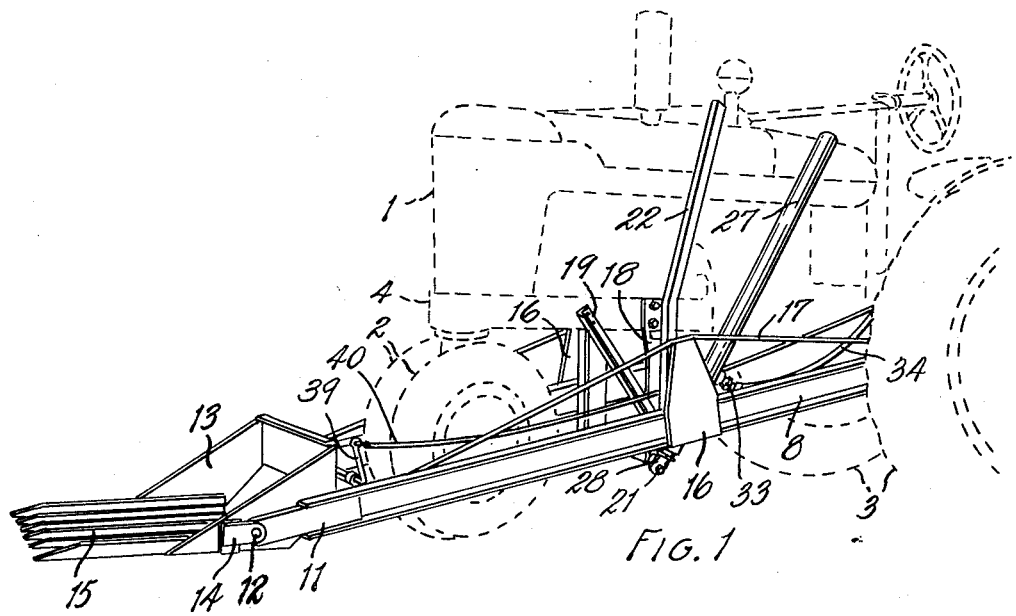
Fig. 1 is a perspective view of the loading attachment as installed on a farm tractor, the tractor being shown in dotted lines.
Figure 3:
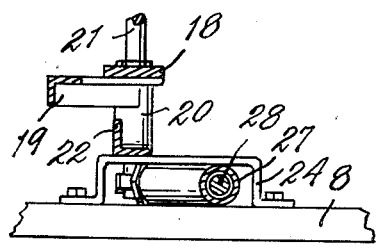
Fig. 3 is a fragmentary cross sectional view along the line 3—3 in Fig. 2.
Figure 2:
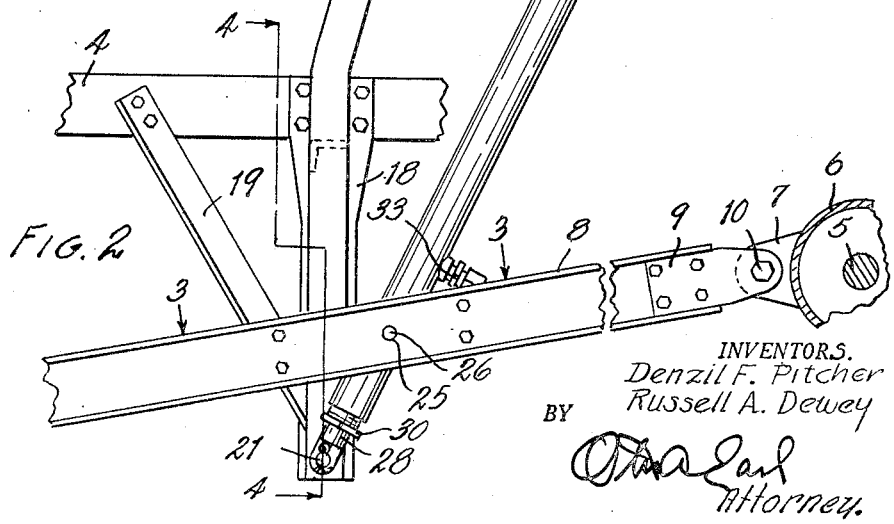
Fig. 2 is a fragmentary side elevational view of the loading attachment and its connections to the tractor, a portion of the tractor being shown in cross section and the reenforcing plate and braces on the boom being omitted.

By way of example, we have shown a tractor I having a pair of closely spaced front wheels 2 and widely spaced rear wheels 3 mounted on generally parallel side frame members 4. The rear wheels are driven by an axial 5 enclosed in a rear axial housing 6 which is provided on its forward side with ears 7 to which our loading attachment is connected. Some farm tractors now commercially available come equipped with ears similar to those shown but other tractors will require their installation as by welding to the rear axial housing for the attachment of the loading mechanism.

The loading attachment comprises a pair of generally parallel booms 8 formed of outwardly facing channel irons which are pivotally connected at their rear ends to the ears 7 by suitable plates 9 bolted to the webs of the channels and forming holes for the pivot pins 10. The forward ends of the booms 8 have extension arms 11 welded within the channel section which define apertures for receiving the pivot pins 12. The pins 12 serve to pivotally mount a scoop 13 on the ends of the booms by engagement with the plates 14 welded to the body of the scoop. Preferably for farm use the scoop is provided with a series of long tines 15 which may be driven into or under a pile of hay or similar material. The particular shape of the scoop may, of course, be changed to best accommodate the type of material to be loaded.

Intermediate of their ends the booms 8 are provided with reenforcing plates 16 which are welded across the open sides of the channel and which extend upwardly above the booms and are connected to the center of tension band braces 17 which slope downwardly at each end toward the ends of the booms where they are secured as by welding.

Bolted on the side frames 4 of the tractor just to the rear of the front wheels 2 are a pair of depending hanger plates 18 which are further braced to the tractor by the forwardly sloping angle irons 19 also bolted at their upper ends to the side frames of the tractor. The lower ends of the hanger plates are apertured and have welded thereto the laterally extending tubular members 20 (see Fig. 4) which form supports for a hanger bar 21 extending horizontally beneath the frame of the tractor. Guide bars 22 of angle shaped cross section are apertured and secured as by welding around the tubular members 20 and spaced laterally outwardly from the hanger plates 18. The guide bars 22 extend vertically upwardly in spaced relationship with the hanger bars and are further braced thereto adjacent to the side frame of the tractor by the angle braces 23. Above the level of the tractor frame the guide bars are bent backwardly so as to be approximately opposite the reenforcing plates 16 as the booms pivot about the pins 10.

The channel beams 8 are spaced laterally outwardly from the sides of the guide braces 22 and are provided with U-shaped brackets 24 which are bolted to the inner sides of the webs of the channel beams. The spacing between the channel beams and guide bars is such that the U-shaped brackets engage the outer sides of the guide bars to guide the beams and maintain them in centered relationship with respect to the tractor as they are raised and lowered.

The U brackets 24 and the opposed sides of the webs of the channel beams are apertured as at 25 to receive and pivotally support the pins 26 formed on the sides of the hydraulic cylinders 27 near the lower ends thereof. The hydraulic cylinders 27 are closed at their upper ends and are provided with piston rods 28 of relatively large cross section which are almost as large as the inside of the cylinders and extend downwardly through sealing gaskets 29 and packing nuts 30. The lower ends of the piston rods 28 are flattened and define apertures 31 which fit pivotally around the ends of the hanger rod 21 and are secured thereto by suitable washers and cotter keys 32.

The side walls of each of the hydraulic cylinders 27 are provided with a fitting 33 by means of which flexible conduits 34 are attached to the cylinders for applying fluid such as oil under hydraulic pressure to the cylinders. Fig. 5 shows conventionally an oil pump 35 and fluid reservoir 36 which are suitably mounted on the tractor and connect by piping 37 and two-way valve 38 for supplying fluid under pressure to extend the cylinders and pistons and for returning fluid from the cylinders to the reservoir to retract the pistons. These parts are shown conventionally only since most tractors are now equipped with suitable fluid pressure pumps and control valves so that these parts need not be supplied with the loading attachment. However, should the attachment be applied to a tractor not having these parts, their addition to the tractor would be a relatively simple matter using well known parts and structures.

The cylinders 27 and pistons 28 form what is known as a squeeze type piston, the fluid under pressure entering the cylinder along the sides of the pistons and completely filling the cylinders to apply hydraulic pressure to the exposed inner ends of the pistons. With this type of piston only one conduit is required between the control valve 38 and each cylinder and no valves or packing are required around the inner ends of the pistons. The piston rods are conveniently installed in the cylinders by merely passing their upper ends through the lower ends of the cylinder and installing the gaskets 29 and packing nuts 30. The pistons are nearly as large as the inside of the cylinders leaving only enough space between the sides of the pistons and the walls of the cylinders for the free flow of fluid therebetween.

In operation the tractor may be driven against a pile of hay or other material to be loaded to force the tines 15 and scoop 13 into the pile of material and the valve 38 may then be rotated from the position shown in Fig. 5 to connect the suction side of the oil pump to the reservoir and the pressure side of the pump to the conduits 34. Fluid under pressure will then enter the cylinders 27 and by reason of its pressure on the ends of the pistons 28 and the upper end of the cylinders 27 will raise the cylinders relative to the pistons which are secured at their lower end to the hanger bar 21. Lifting of the cylinder causes a lifting of the channel beams 8 due to the engagement of the pins 26 with the channel beams and the U-shaped brackets 24. The tractor may then be driven to the unloading point and the scoop 13 emptied by releasing a suitable catch indicated generally at 39 in Fig. 1 to permit the scoop to over-balance forwardly on the pivot pins 12 and dump its load. A control cord 40 extends from the trip mechanism 39 to a convenient operating location near the driver's seat on the tractor. During the upward movement of the channel beams and during the movement of the tractor from the loading to unloading point, the angle braces 22 will engage the inner surfaces of the U brackets 24 to prevent the scoop 13 swaying from side to side.

It will be noted that the parts of the loading attachment are constructed almost entirely from standard metal shapes and need very little fabricating work done thereon other than to cut them to desired lengths and properly weld or bolt the parts together. The hanger bar 21 is positioned underneath the tractor where it will not interfere with the operation of the tractor for other purposes besides loading so that it may be left installed on the tractor even though the booms and scoops are removed. The guide bars and cylinders terminate at their upper ends approximately level with the top of the tractor and so do not obstruct the vision of the operator.

The length and position of the cylinders and pistons is of particular advantage because the relatively long travel of the cylinders permits them to be positioned further away from the pivots of the booms and still obtain the desired lift height at the scoop. The cylinders having a longer lever arm on the booms may be operated at a lower pressure than cylinders having less mechanical advantage.

Having thus described our invention, what we claim as new and desire to secure by Letter Patent is:

1. A loading attachment for a tractor or the like having narrowly spaced front wheels and widely spaced rear wheels mounted on a frame comprising a pair of generally parallel outwardly facing beams of channel shaped cross section pivotally secured at their rear ends to the rear axle housing of the tractor and extending forwardly of said front wheels, U-shaped brackets secured to the inner sides of said beams intermediate of the ends thereof, a scoop member pivotally supported between the forward ends of said beams, a trip lever supported on said beams and arranged to releasably engage said scoop to prevent rotation thereof, a hanger including a laterally extending tube secured to each side of said frame and extending therebelow and behind said front wheels, a hanger bar supported in said tubes and extending therethrough, elongated tubular cylinders and with closed upper ends and having pins near their lower ends and pivotally mounted between said brackets and beams, pistons having relatively large diameters slidably and sealingly positioned in said cylinders and having their lower ends projecting from the lower ends of said cylinders and pivotally secured to the ends of said hanger bar, upwardly extending guide bars of angle shaped cross section supported at their lower ends on said hanger tubes and extending upwardly in parallel relationship on each side of said tractor, said U-shaped brackets being in sliding relationship with said guide bars, a conduit including a valve and fluid pump arranged to supply fluid under pressure to said cylinder, and an operating cord for releasing said scoop and extending to adjacent the driver's position of the tractor, said guide bars and pistons extending to substantially level with the top of said tractor.

2. A loading attachment for a tractor or the like having narrowly spaced front wheels and widely spaced rear wheels mounted on a frame comprising a pair of generally parallel outwardly facing channel shaped beams pivotally secured at their rear ends to the rear axle housing of the tractor and extending forwardly of said front wheels, U-shaped straps secured to the sides of said beams substantially at the mid-points thereof, a scoop member pivotally supported between the forward ends of said beams, a trip lever supported on said beams and arranged to releasably engage said scoop to prevent rotation thereof, a hanger including transversely extending tubes secured to each side of said frame and extending therebelow, a hanger bar supported by said tubes and extending therethrough, elongated tubular cylinders with closed upper ends and pivotally mounted near their lower ends between said straps and beams, pistons having slightly smaller diameters than the inside of said cylinders positioned in said cylinders and having their lower ends projecting from the lower ends of said cylinders and pivotally secured to said hanger bar, upwardly extending guide bars supported at their lower ends on said hanger bar and extending in parallel relationship on each side of said tractor, said straps being in sliding contact with said guide bars, and a conduit including a valve and fluid pump arranged to supply fluid under pressure to said cylinder, said guide bars and cylinders extending to slightly above the operator's seat of said tractor.

3. A loading attachment for a tractor or the like having front and rear wheels mounted on a frame comprising a pair of generally parallel outwardly facing channel shaped beams pivotally secured at their rear ends to the rear of the tractor and extending forwardly of the front wheels, a loading member pivotally supported between the forward ends of said beams, a trip lever supported on said beams and arranged to releasably engage said loading member to prevent rotation thereof, a hanger including a transversely extending bar secured to the underside of said frame and extending therebelow and behind said front wheels, elongated tubular cylinders with closed upper ends and pivotally mounted near their lower ends to said beams, pistons having relatively large diameters positioned in said cylinders and having their lower ends projecting from the lower ends of said cylinders and pivotally secured to said hanger bar, upwardly extending guide bars of channel shaped cross section supported at their lower ends on said hanger and extending in parallel relationship on each side of said tractor, a conduit including a valve and fluid pump arranged to selectively supply fluid under pressure to said cylinder, and an operating cord for releasing said scoop and extending to adjacent the driver's position of the tractor.

4. A loading attachment for a wheeled vehicle comprising a pair of beam members pivotally secured to the rear axial housing of the vehicle and extending forwardly of the front wheels thereof, a pair of hanger brackets secured to the frame of the vehicle intermediate of the front and rear wheels thereof and depending below said frame, a hanger bar secured to the bottom of said hanger brackets and extending laterally on each side thereof, a pair of guide bars secured to each end of said hanger bar and extending upwardly in spaced relationship with said hanger brackets, said guide bars being braced to the upper portions of said hanger brackets, a pair of U-shaped brackets secured to the inner sides of said beams opposite said hanger brackets and in sliding relationship with said guide bars, said beams and U shaped brackets defining aligned apertures, a pair of elongated cylinders closed at upper ends and having pins extending from the sides thereof near the open ends thereof, said pins being mounted in said apertures, a pair of piston rods extending through the open ends of said cylinders and pivotally connected at their lower ends to the ends of said hanger bar, packing members sealing the open ends of said cylinders around said piston rods, flexible conduits arranged to admit fluid under pressure to said cylinders, a hydraulic pump and valve on said vehicle arranged to supply fluid to said conduits, and a load carrying member pivotally supported between the free ends of said beams, said cylinders extending upwardly to slightly above the level of the operator's seat of the vehicle.

5. A loading attachment for a wheeled vehicle comprising a pair of beam members pivotally secured to the rear axle housing of the vehicle and extending forwardly of the front wheels thereof, a pair of hanger brackets secured to the frame of the vehicle intermediate of the front and rear wheels thereof and depending below said frame, a hanger bar secured to the bottom of said hanger brackets and extending laterally on each side thereof, a pair of guide bars secured to each end of said hanger bar and extending upwardly in spaced relationship with said hanger brackets, said guide bars being braced to the upper portions of said hanger brackets, a pair of U-shaped brackets secured to the sides of said beams opposite said hanger brackets and in sliding relationship with said guide bars, said beams and U-shaped brackets defining aligned apertures, a pair of elongated cylinders closed at upper ends and having pins extending from the sides thereof near the open ends thereof, said pins being mounted in said apertures, a pair of piston rods extending through the open ends of said cylinders and pivotally connected at their lower ends to the ends of said hanger bar, packing members sealing the open ends of said cylinders around said piston rods, flexible conduits arranged to admit fluid under pressure to said cylinders, a hydraulic pump and valve on said vehicle arranged to selectively supply fluid to said conduits, and a load carrying member pivotally supported between the said ends of said beams.

6. A loading attachment for a wheeled vehicle comprising a pair of beam members pivotally secured to the rear axle housing of the vehicle and extending forwardly of the front wheels thereof, a pair of hanger brackets secured to the frame of the vehicle intermediate of the front and rear wheels thereof and depending below said frame, a hanger bar secured to the bottom of said hanger brackets and extending laterally on each side thereof, a pair of guide bars secured to each end of said hanger bar and extending upwardly in spaced relationship with said hanger brackets, said guide bars being braced to the upper portions of said hanger brackets, a pair of elongated cylinders closed at upper ends and having pins extending from the sides thereof near the open ends thereof, said pins being pivotally mounted in said beams, said cylinders being slidingly supported by said guide bars, a pair of piston rods extending through the open ends of said cylinders and pivotally connected at their lower ends to the ends of said hanger bar, packing members sealing the open ends of said cylinders around said piston rods, flexible conduits arranged to admit fluid under pressure to said cylinders, a hydraulic pump and valve on said vehicle arranged to supply fluid to said conduits, and a load carrying member supported between the free ends of said beams.

DENZIL F. PITCHER.
    RUSSELL A. DEWEY.

REFERENCES CITED

The following references are of record in the file of this patent:

UNITED STATES PATENTS

| Number | Name | Date |
|---|---|---|
| 2,019,938 | Stephens | Nov. 5, 1935 |
| 2,268,689 | Andrus | Jan. 6, 1942 |
| 2,301,102 | Wertham et al. | Nov. 3, 1942 |
| 2,304,443 | Butler | Dec. 8, 1942 |
| 2,319,921 | Dooley et al. | May 25, 1943 |
| 2,385,512 | Heath | Sept. 25, 1945 |
| 2,393,435 | Wachter | Jan. 22, 1946 |
| 2,412,323 | Conrad | Dec. 10, 1946 |
| 2,418,251 | Drott | Apr. 1, 1947 |
| 2,418,403 | Grabske | Apr. 1, 1947 |
| 2,451,101 | Leschinsky | Oct. 12, 1948 |